United States Patent [19]

Hauser

[11] 4,455,889
[45] Jun. 26, 1984

[54] FREE FLOATING PINION SHAFT

[75] Inventor: Hans Hauser, Chippewa Lake, Ohio

[73] Assignee: MTD Products Inc., Cleveland, Ohio

[21] Appl. No.: 310,485

[22] Filed: Oct. 8, 1981

[51] Int. Cl.³ .............................. F16H 1/40; F16H 1/38
[52] U.S. Cl. .......................................... 74/713; 74/710
[58] Field of Search ...................... 74/710, 710.5, 711, 74/713

[56] References Cited

U.S. PATENT DOCUMENTS

| 968,224 | 8/1910 | Wolf | 74/710.5 |
|---|---|---|---|
| 1,308,614 | 7/1919 | Baldock | 74/713 |
| 2,234,890 | 3/1941 | Brosseau | 74/710.5 |
| 2,490,146 | 12/1949 | Miller | 74/711 |
| 2,785,588 | 3/1957 | Sampietro | 74/711 |
| 3,323,388 | 6/1967 | Snoy et al. | 74/710 |
| 3,376,760 | 4/1968 | Gordanier | 74/710.5 |
| 3,400,610 | 9/1968 | Taylor et al. | 74/710.5 |
| 4,224,839 | 9/1980 | von Kaler | 74/713 X |
| 4,289,047 | 9/1981 | Hopkins | 74/710 X |

FOREIGN PATENT DOCUMENTS

| 2744330 | 4/1979 | Fed. Rep. of Germany | 74/711 |
| 2382627 | 11/1978 | France | 74/710 |

Primary Examiner—Allan D. Herrmann
Assistant Examiner—Stephen B. Andrews
Attorney, Agent, or Firm—Woodling, Krost & Rust

[57] ABSTRACT

A differential is disclosed having a self centering pinion shaft (12), pinion gear (13, 14) assembly, the assembly free floating on bushings (41, 42) between the pinion shaft (12) and the housing (11) of the differential.

4 Claims, 3 Drawing Figures

FREE FLOATING PINION SHAFT

FIELD TO WHICH INVENTION RELATES

My invention relates to the pinion shaft of a differential. It is especially suitable for use with a deep drawn stamped construction differential housing.

STATEMENT OF THE INVENTION

It is an object of this invention to equalize pinion shaft side loads in a differential.

It is an object of this invention to increase the width dimensional tolerances in differentials.

It is an object of this invention to have self centering pinion gears in a differential.

It is an object of this invention to reduce shaft wear in differentials.

It is an object of this invention to spread the pinion shaft loads generated by the differential over an expanded area.

It is an object of this invention to lower the cost of differentials.

Other advantages and a fuller understanding of the invention may be had by referring to the following description and claims, taken in conjunction with the accompanying drawings, in which:

DESCRIPTION OF THE INVENTION HEREIN DISCLOSED

Figure 1:
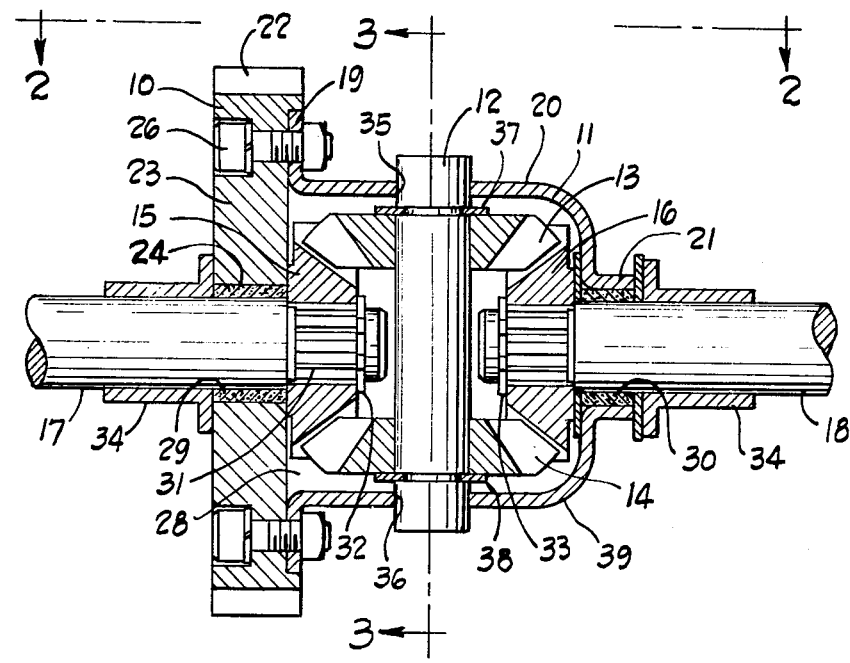
FIG. 1 is a cutaway side view of a differential built according to the invention of this application.
Figure 2:
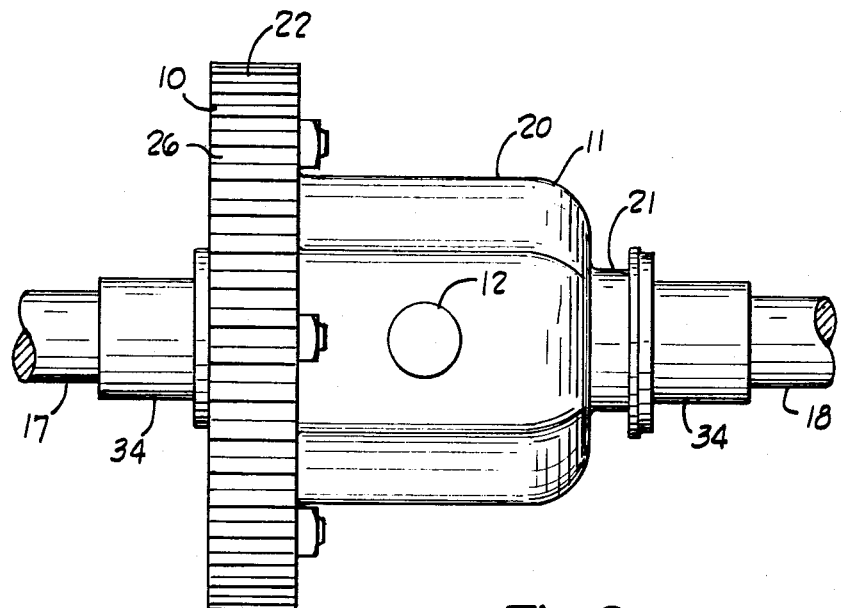
FIG. 2 is a top view of the differential of FIG. 1 taken generally from line 2—2 of that figure.
Figure 3:
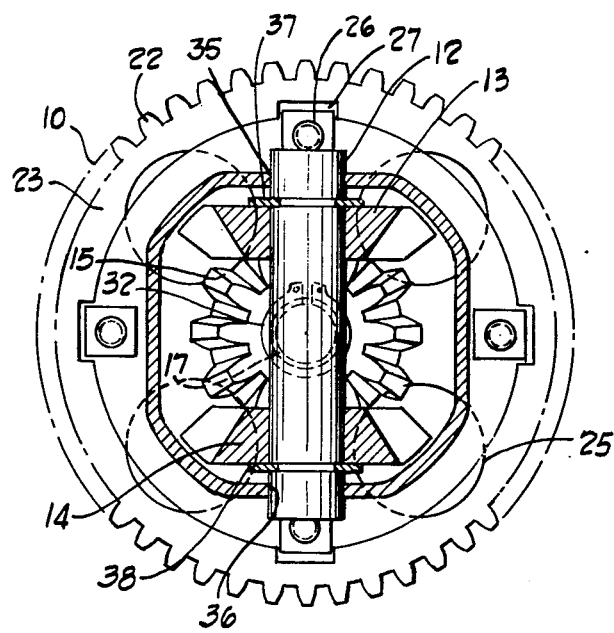
FIG. 3 is a cutaway end view of the differential of FIG. 1 taken generally along line 3—3 of that figure.

The improved differential of this disclosure has a ring gear 10, a housing 11, a pinion shaft 12, pinion gears 13, 14, side gears 15, 16 and aligned shafts 17, 18. See FIGS. 1–3. The housing 11 is made of stamped steel. The housing 11 has a mounting flange 19, a main body portion 20 and a reduced portion 21 as shown. The ring gear 10 is cast of powdered metal. The ring gear 10 has teeth 22 extending around its outer circumference and a body portion 23. There is a central hole 24 and multiple weight reducing holes 25 through the body portion 23 of the ring gear 10. See FIGS. 1, 3, 4 and 5. The mounting flange 19 of the housing 11 is connected by bolts 26 to the body portion 23 of the ring gear 10. Small tabs 27 on the mounting flange 19 of the housing 11 lock into corresponding recesses in the body portion 23 of the ring gear 10. See FIGS. 1, 3 and 4. These recesses also prevent the nuts on bolts 26 form rotating during the assembly of the differential. The connected housing 11 and ring gear 10 define an inside space 28 of the differential.

One shaft 17 extends through the central hole 24 in the body portion 23 of the ring gear 10 into the inside space 28 of the differential. There is a sleeve bearing 29 between the shaft 17 and the ring gear 10. The other shaft 18 extends through the reduced portion 21 of the housing 11. There is a sleeve bearing 30 between this shaft 18 and the housing 11. The side gears 15 and 16 are fixedly connected to the shafts 17 and 18, respectively, through spline interconnections 31 in the usual manner. Snap rings 32, 33 prevent disconnection of the gears from the shafts. The side gears 15 and 16 are of powdered metal construction.

The differential is attached to the transmission housing (not shown) through sleeve bearings 34 in the usual manner.

There are two diametrically opposing pinion shaft support holes 35 and 36 in the main body portion 20 of the housing 11. The pinion shaft 12 extends axially through and between the holes 35 and 36 and is supported thereby. The pinion shaft 12 can rotate within these holes 35, 36. The pinion shaft 12 also has a limited amount of axial movement in respect to the housing 11. The amount of axial movement of the pinion shaft 12 is defined hereinafter. The pinion shaft 12 supports the pinion gears 13 and 14 which gears are freely journaled thereon in the usual manner.

Snap rings 37, 38 on the pinion shaft 12 act to maintain the distance between the pinion gears 13 and 14. The snap rings 37, 38 engage the outer side of the pinion gears 13, 14. The gears 13 and 14 have a limited amount of axial movement in respect to the pinion shaft 12. The axial movement of the gears 13, 14 is defined on the inside by the physical mass of the side gears 15 and 16 and on the outside by the snap rings. The axial movement of the pinion shaft 12 is defined by the gears 13, 14 and snap rings 37, 38. The distance between the snap rings 37 and 38 defines the spacing of the pinion gears 13 and 14 and the amount of axial movement of both the pinion gears and the pinion shaft.

Because of these relatively free rotational and axial movements, the gears 13 and 14 seek and maintain positions of torsional equilibrium. This equalizes at all times the forces generated on the ends of the pinion shaft. The pinion forces on the differential are balanced. The differential need not be designed for unbalanced loads. The differential will last longer. The pinion shaft-pinion gear assembly floats and is self centering in respect to the housing. The pinion gear mounting dimension is held by backing up the pinion gears 13, 14 against the snap rings 37, 38. The distance between the snap rings 37 and 38 is the critical lateral dimension of the differential. This distance is easily and precisely defined in a machining operation on the pinion shaft 12. It is not necessary to hold the lateral widht of the housing of the differential to any significant tolerance. For this reason, the housing 11 can be made of a deep drawn stamping. The width dimension, difficult to hold in a deep drawn stamping, is no longer of any great concern.

The compression strength of the bushings 41, 42 is chosen such that the bushings 41, 42 can withstand the side forces generated by the pinion shaft 12. The bushings 41, 42 are of powdered metal construction.

Due to the fact that the pinion shaft loads are spread out over the outer circumferential area of the bushings 41, 42 rather than the significantly less outer circumferential area of the pinion shaft 12, the walls of the housing 11 can be relatively thin and not as strong as otherwise. The bushings 41, 42 with their compression strength greater than that of the walls of the housing 11 can absorb and resist the side thrusts of the pinion shaft 12. Due to the increased width of the bushing-housing connection, these side thrusts are spread out over an expanded area of the main body portion 20 of the housing 11. The increased width also reduces wear in the region.

Snap rings 43, 44 on the outer side of the bushings 41, 42, prevent the pinion shaft 12 from becoming disconnected from the bushings 41, 42 respectively. The snap rings 43, 44, through the thickness of the bushings 41, 42, maintain the distance between the pinion gears 13 and 14. Again the distance between the snap rings is the critical lateral dimension of the differential, and again this distance is easily and precisely definable in a machining operation on the pinion shaft 12.

In the preferred alternate embodiment disclosed, snap rings 43, 44 and bushings 41, 42 replace the snap rings 37, 38 in locating the pinion gears 13, 14. Both sets of snap rings could be used if conditions warranted.

For certain high power applications, it is advantageous to form the bushing-pinion gear intersection in a curve as illustrated in FIG. 5. This curvature on the outer face of the pinion gears 13B, 14B and the inner face of the bushings 41B, 42B, enables any side load of the pinion gears 13B, 14B to be transmitted diagonally or obliquely through the bushings to the housing 11. The curved shape also reduces the quantity of metal used to make the high power pinion gears as seen contrasting FIG. 1 with FIG. 5.

Although this invention has been described in its preferred form with a certain degree of particularity, it is to be understood that numerous changes may be made without departing from the invention as hereinafter claimed.

What is claimed is:

1. In a differential with a housing with sidewalls having a pair of axially aligned pinion shaft support holes therein and with a pinion shaft extending longitudinally between the holes, the pinion shaft having a pair of pinion gears freely journaled thereon, the improvement of a pinion mounting comprising a pair of retention pieces mounted on said shaft within said housing and spaced from the sidewalls thereof, a first of said pair of retention pieces being mounted on the pinion shaft on the outer side of a first of the pair of pinion gears, said first pinion gear being in direct bearing engagement with said first retention piece, a second of said pair of retention pieces being mounted on the pinion shaft on the outer side of a second of the pair of pinion gears, said second pinion gear being in direct bearing engagement with said second retention piece, the pinion shaft being longitudinally free floating in respect to the sidewalls of the housing and said pair of retention pieces within the housing acting to prevent the disengagement of the pinion shaft through a said hole from the housing.

2. In a differential with a housing having a width, with sidewalls having a pair of axially aligned pinion support holes therein and with a pinion shaft extending longitudinally between the holes, the pinion shaft having a pair of pinion gears freely journaled thereon, the improvement of a pinion mounting comprising a pair of retention pieces mounted on said shaft within said housing and spaced from the sidewalls thereof, a first of said pair of retention pieces being mounted on the pinion shaft on the outer side of a first of the pair of pinion gears, said first pinion gear being in bearing engagement with said first retention piece, a second of said pair of retention pieces being mounted on the pinion shaft on the outer side of a second of the pair of pinion gears, said second pinion gear being in bearing engagement with said second retention piece, the pinion shaft having a length greater than the width of the housing, the pinion shaft protruding outwardly of the sidewalls, the pinion shaft being longitudinally free floating in respect to the sidewalls of the housing and said bearing engagement of the pinion gears against said pair of retention pieces mounted on said shaft within said housing acting to prevent the disengagement of the pinion shaft through said holes from the housing.

3. The structure of claim 2 characterized by the addition of a pair of side gears in engagement with said pinion gears, and in that said pair of retention rings embrace said pair of pinion gears therebetween to maintain the pinion gears in engagement with the pair of side gears.

4. In a differential having a housing, the housing having sidewalls, the sidewalls having a pair of axially aligned pinion support holes therein, sidegears, and with a pinion shaft extending longitudinally between the holes, the pinion having a pair of pinion gears freely journaled therein, there being spaces between the pinion gears and the sidewalls, respectively, the improvement of a pinion shaft mounting comprising a pair of retention pieces, a first of said pair of retention pieces being mounted on the pinion shaft on the outer side of a first of the pair of pinion gears in the space between said first pinion gear and the respective sidewall, said first pinion gear being in bearing engagement with said first retention piece, said first retention piece being out of bearing engagement with the sidewall, a second of said pair of retention pieces being mounted on the pinion shaft on the outer side of a second of the pair of pinion gears in the space between said second pinion gear and the respective sidewall, said second pinion gear being in bearing engagement with said second retention piece, said second retention piece being out of bearing engagement with the sidewall, the pinion shaft being longitudinally free floating in respect to the sidewalls of the housing and said pair of retention pieces acting to keep the pinion gears in engagement with the side gears.

* * * * *